United States Patent
Cameron

(10) Patent No.: US 9,690,626 B2
(45) Date of Patent: Jun. 27, 2017

(54) PROCESSING WORKLOADS IN SINGLE-THREADED ENVIRONMENTS

(71) Applicant: VMware, Inc., Palo Alto, CA (US)

(72) Inventor: Stefan Cameron, Mountain View, CA (US)

(73) Assignee: VMware, Inc., Palo Alto, CA (US)

(*) Notice: Subject to any disclaimer, the term of this patent is extended or adjusted under 35 U.S.C. 154(b) by 72 days.

(21) Appl. No.: 14/317,790

(22) Filed: Jun. 27, 2014

(65) Prior Publication Data

US 2015/0378787 A1    Dec. 31, 2015

(51) Int. Cl.

| | | |
|---|---|---|
| *G06F 9/34* | (2006.01) | |
| *G06F 9/50* | (2006.01) | |
| *G06F 9/48* | (2006.01) | |
| *G06T 1/20* | (2006.01) | |
| *H04N 21/00* | (2011.01) | |
| *G06F 17/30* | (2006.01) | |
| *H04N 21/443* | (2011.01) | |

(52) U.S. Cl.
CPC .......... *G06F 9/5011* (2013.01); *G06F 9/4881* (2013.01); *G06F 9/4887* (2013.01); *G06F 17/30899* (2013.01); *G06T 1/20* (2013.01); *H04N 21/00* (2013.01); *H04N 21/443* (2013.01); *G06T 2200/28* (2013.01)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 8,291,460 B1 | 10/2012 | Peacock | |
| 9,032,165 B1 * | 5/2015 | Brooker | G06F 12/0806 711/154 |
| 2007/0113223 A1 * | 5/2007 | Ludwig | G06F 8/445 717/161 |
| 2007/0150431 A1 * | 6/2007 | Jochemsen | H04N 21/2393 |

(Continued)

FOREIGN PATENT DOCUMENTS

EP    2581829 A2    4/2013

OTHER PUBLICATIONS

Weiskopf et al., Maintaining Constant Frame Rates in 3D Texture-Based Volume Rendering, 2004.*

(Continued)

*Primary Examiner* — H S Sough
*Assistant Examiner* — Zhan Chen

(57) ABSTRACT

A computer implemented method for assigning workload slices from a workload to upcoming frames to be processed during the rendering of the upcoming frames. The processing time of upcoming frames and workload slices varies at runtime according to system resources The method determines an effective frame rate that estimates the duration of an upcoming frame and also determines an effective slice rate that estimates the time it takes to complete an upcoming workload slice. Based on the effective frame rate and the effective slice rate, the method then calculates the slice-to-frame ratio which defines the rate in which slices are assigned to upcoming frames. The slice-to-frame ratio can dynamically change to accommodate for changes to the processing time of rendered frames and completed workload slices.

20 Claims, 5 Drawing Sheets

(56) References Cited

U.S. PATENT DOCUMENTS

| | | | | |
|---|---|---|---|---|
| 2009/0119668 | A1* | 5/2009 | Foley | G06F 9/542 718/102 |
| 2010/0054339 | A1* | 3/2010 | Schlanger | H04N 7/32 375/240.25 |
| 2010/0125847 | A1* | 5/2010 | Hayashi | G06F 9/505 718/102 |
| 2013/0013671 | A1* | 1/2013 | Relan | H04L 67/34 709/203 |
| 2013/0047074 | A1* | 2/2013 | Vestergaard | G06F 3/14 715/234 |
| 2013/0328894 | A1* | 12/2013 | Moore | H04N 21/41407 345/522 |
| 2015/0254105 | A1* | 9/2015 | Nishimura | G06F 9/5088 718/103 |

OTHER PUBLICATIONS

Tasaka et al., The Effectiveness of a QoE-Based Video Output Scheme for Audio-Video IP Transmission, 2008.*
Sami Kyostila et al, "Scheduling Tasks Intelligently for Optimized Performance", May 25, 2015, Retrieved from the Internet: URL: https://web.archive.org/web/20150525015030/http://blog.chromium.org/2015/04/scheduling-tasks-intelligently-for_30.html (retrieved on Sep. 15, 2015), 2 pages.
Ross McIlroy, "Cooperative Scheduling of Background Tasks", Sep. 9, 2015, Retrieved from the Internet: URL:https://w3c.github.io/requestidlecallback (retrieved on Sep. 14, 2015), 7 pages.
International Search Report and Written Opinion—PCT/US2015/037811—ISA/EPO—Sep. 30, 2015.

* cited by examiner

PROCESSING WORKLOADS IN SINGLE-THREADED ENVIRONMENTS

BACKGROUND

A single-threaded environment is a processing environment where an application is executed using a single thread. The single-threaded environment can be render-, frame-, or time-based. Example single-threaded environments include NodeJS™, Adobe FlashPlayer™, and web browsers. FIG. 1 depicts an example of a single-threaded environment. As shown, application 100 is running on a single thread of a processor to render video or other media through multiple frames (frames 101-109).

Here, application 100 detects an event 110 (e.g., a user input or mouse click) during the rendering of frame 101 and assigns workload 115 (the workload that corresponds to click event 110) to be performed in the subsequent frame, frame 102. As a result, workload 115 can be executed as frame 102 is being rendered. Unfortunately, workload 115 may take longer than the duration of frame 102 to execute, which leads to application 100 skipping frames 103 and 104 because the processing time for frame 102 extended into the processing time of frames 103 and 104 due to the processing of workload 115. Skipped frames are not rendered in the single-threaded environment and thus are not presented to the user.

Similarly, application 100 detects click event 120 during the rendering of frame 102 and assigns workload 125 (the workload that corresponds to click event 120) to be performed in a subsequent frame. Workload 125 is assigned to the next available subsequent frame, which is frame 105 since frames 103 and 104 have been skipped. As a result, application 100 executes workload 125 during the rendering of frame 105. Like workload 115, workload 125 takes longer than the duration of frame 105 to execute which leads to frames 106, 107, and 108 being skipped. Due to these large workloads, only four of the nine frames have been rendered (e.g., frames 101, 102, 105, and 109). As a result, the rendered video may appear choppy or unresponsive, which is frustrating to the user.

DETAILED DESCRIPTION

Figure 1:
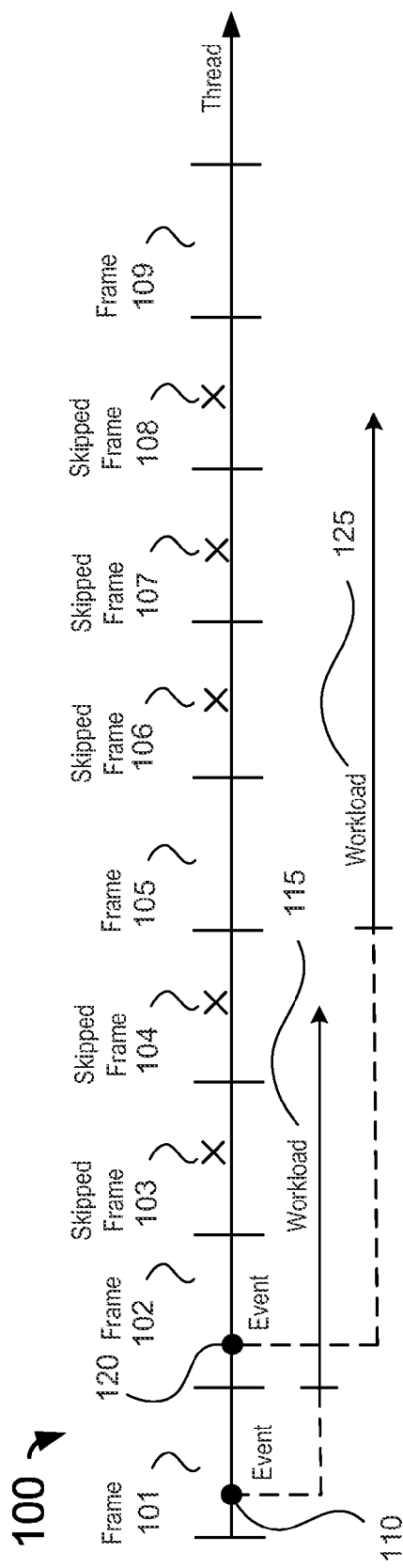
FIG. 1 depicts an exemplary single-threaded environment.

In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Techniques are described for executing a workload in a single-threaded environment. An application running in the single-threaded environment can be rendering video or other media through multiple frames. The application has a configured frame rate and an effective frame rate that is the actual rate in which frames are being processed at runtime. Since processing power is dependent on system load, the effective frame rate can fluctuate when the application is running. While the application is running, the application can detect an event that triggers a workload to be executed by the application. The application can divide the workload into workload slices and schedule the workload slices to be processed along with upcoming frames. In some examples, the workload slices can be substantially the same size. When it is time to process an upcoming frame, the application can process the upcoming frame along with any workload slices that have been assigned to the upcoming frame.

The application can schedule workload slices according to a slice-to-frame ratio that defines the rate in which workload slices are assigned to upcoming frames. For example, a slice-to-frame ratio of 1:2 would mean that one workload slice would be assigned to every other upcoming frame while a slice-to-frame ratio of 2:1 would mean that two workload slices would be assigned to each upcoming frame. If too many workload slices are assigned to an upcoming frame, the upcoming frame can take longer than the effective frame rate of the upcoming frame, thus resulting in one or more subsequent frames being skipped. Given that the effective frame rate varies depending on the load on the system, techniques can be applied to dynamically adjust the slice-to-frame ratio in order to maximize the number of workload slices that are executed in an upcoming frame (thus reducing the time needed to complete the workload) while minimizing the occurrence of skipped frames. In some embodiments, workload slices can also be scheduled further apart in order to reduce choppiness or unresponsiveness in the rendered video. In yet other embodiments, the techniques here can be applied to other single-threaded environments where execution privileges are measured using a unit of time other than a frame. For example, models for video playback, document rendering, workload processing, etc. may be driven by event loops where a portion of the application is executed in each event loop. In the context of a movie player, each event loop can be a frame presented by the movie player. In the context of a browser, each event loop can be a period of time in which application resources are dedicated to the application code.

Figure 2:
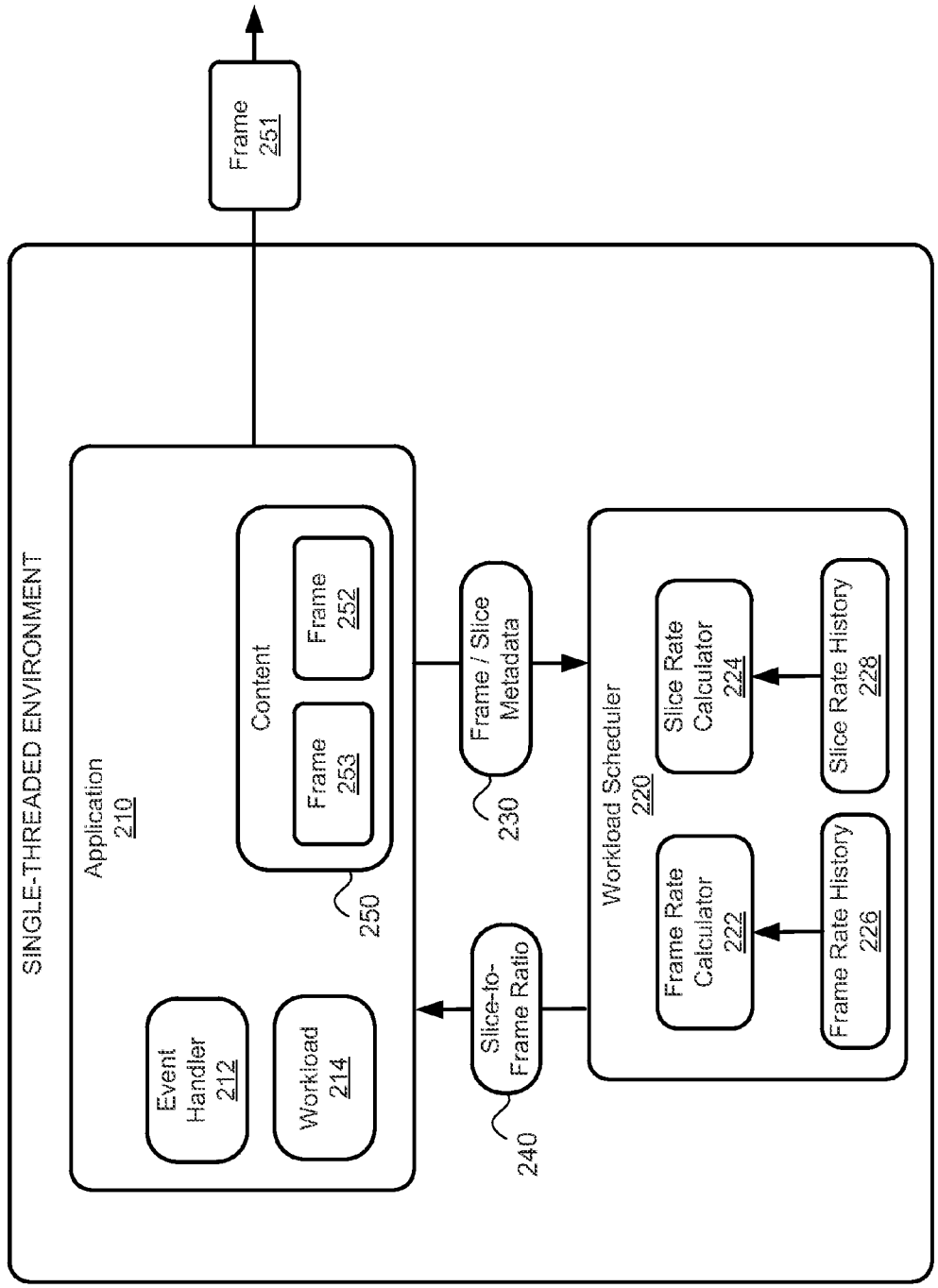
FIG. 2 depicts a single-threaded environment according to one embodiment.

FIG. 2 depicts a single-threaded environment according to one embodiment. Environment 200 may be executed on one or more computing devices (not shown) and includes application 210, which is configured to render content 250 on a display. Content 250 can be a video or other media content that includes frames 251, 252, and 253. A frame can represent a single still image of a sequence of images being displayed (e.g., a frame of a video, a frame in the frame buffer to provide a UI, etc). Frames which have yet to be rendered by application 210 are known as upcoming frames while frames which have been rendered by application 210 are known as rendered frames. In some embodiments, one or more slices of a workload can be processed as a frame is being rendered. A slice can represent a portion of the workload or any unit of the workload. Here, application 210 has rendered frame 251. The next frame to be rendered is frame 252, followed by frame 253.

Application 210 includes event handler 212. Event handler 212 is configured to handle inputs received in application 210. The inputs can be received through a biometric sensor, camera input, touch input, mouse, keyboard, or other peripheral device while a frame is being rendered on the display. For example, the input can be a request to perform a calculation on a dataset accessible by the application. Upon detecting the input, event handler 212 can trigger an event. The triggered event can be associated with a workload. Application 210 can process the workload after the event is triggered. Here, an event was triggered while frame 251 is being presented. In response to the event, application 210 is going to process workload 214 in one or more upcoming frames. Application 210 can process workload 214 by dividing workload 214 into many workload slices and assigning the workload slices to upcoming frames that are to be rendered (e.g., frames 252 and 253).

Environment 200 further includes workload scheduler 220. Workload scheduler 220 can be an application such as a plugin extension that adds a feature to application 210. Here, workload scheduler 220 is configured to monitor the performance of application 210 and in turn adjust slice-to-frame ratio 240 of application 210. Monitoring the performance can include measuring the duration of a frame rendered by application 210 or measuring the time it took to process a workload slice assigned to the rendered frame. Workload scheduler 220 can retrieve the measurements as frame/slice metadata 230. Upon retrieving the measurements, workload scheduler 220 can dynamically adjust slice-to-frame ratio 240. As discussed above, slice-to-frame ratio 240 defines the rate in which application 210 assigns workload slices to upcoming frames.

Workload scheduler 220 includes frame rate calculator 222. Frame rate calculator 222 is configured to calculate the effective frame rate of application 210. The effective frame rate is an estimate of the frame rate of application 210 during runtime. In one embodiment, frame rate calculator 222 can calculate the effective frame rate based on frame/slice metadata 230 of a recently rendered frame. For example, frame rate calculator 222 can calculate the effective frame rate by measuring the duration of the most recently rendered frame. In other embodiments, frame rate calculator 222 can calculate the effective frame rate based on frame/slice metadata 230 and frame rate history 226, which contains historical data on the measured frame rate of application 210. Advantages of considering frame rate history 226 in the calculation of the effective frame rate include reducing the effect of temporary spikes in performance by analyzing the application's frame rate over time. This prevents performance from dropping or accelerating due to system due to temporary changes to system load.

Workload scheduler 220 further includes slice rate calculator 224. Similar to frame rate calculator 222, slice rate calculator 224 is configured to calculate the effective slice rate of application 210, which is an estimated rate in which application 210 is able to process a workload slice during runtime. In one embodiment, slice rate calculator 224 can calculate the effective slice rate based on frame/slice metadata 230. For example, slice rate calculator 224 can calculate the average time it took for each workload slice to complete in a given frame. In other embodiments, slice rate calculator 224 can calculate the effective frame rate based on frame/slice metadata 230 and slice rate history 228 which contains historical data on measured slice rate of application 210. Advantages of considering slice rate history 228 in the calculation of the effective slice rate include reducing the effect of temporary spikes (either high or low spikes) in performance by analyzing the application's slice rate over time. In some embodiments, workload scheduler 220 can store frame/slice metadata 230 in frame rate history 226 and slice rate history 228.

Workload scheduler 220 can adjust slice-to-frame ratio 240 based on the effective frame rate and the effective slice rate calculated by frame rate calculator 222 and slice rate calculator 224, respectively. In one embodiment, workload scheduler 220 can first determine whether the effective frame rate is larger or smaller than the effective slice rate. If the effective frame rate is larger than the effective slice rate, then workload scheduler 220 can divide the effective frame rate by the effective slice rate and truncate the result to determine the number of slices to assign to each upcoming frame. For instance if the effective frame rate is 40 ms and the effective slice rate is 15 ms, then the workload scheduler could set the slice-to-frame ratio 240 to be 2:1 which would enable two workload slices to be processed per every upcoming frame and still maintain a 10 ms buffer. Alternatively if the effective frame rate is smaller than the effective slice rate, then workload scheduler 220 can divide the effective slice rate by the effective frame rate and truncate the result to determine the number of frames that should pass before another workload slice is assigned to an upcoming frame. For instance if the effective frame rate is 40 ms and the effective slice rate is 120 ms, then slice-to-frame ratio would be 1:3 which would equal one workload slice every three frames. By spacing out the workload slices, the video rendered can appear less choppy and unresponsive since it allows more frames to be rendered in between frames that are skipped due to the workload slice taking longer to execute than the effective frame rate. In some examples, application 210 can attempt to adjust the size of workload slices so that they may fit within a single frame.

In one embodiment, workload scheduler 220 can adjust slice-to-frame 240 after a frame has been rendered. Upon detecting the completion of the rendering of a frame, workload scheduler 220 can calculate the effective slice rate and the effective frame rate. Workload scheduler 220 can then subsequently calculate slice-to-frame ratio 240 according to the effective slice rate and the effective frame rate. Application 210 can assign slices to upcoming frames according to the slice-to-frame ratio. In one embodiment, application 210 make a determination of whether to assign a workload slice to an upcoming frame based on slice-to-frame ratio 240. If the number of frames as defined by slice-to-frame ratio 240 have not been rendered yet, then application 210 can skip assigning another workload slice to an upcoming frame. Once the number of frames have been rendered, then application 210 can assign the next workload slice to the upcoming frame. As a result, frames which are skipped due to a frame taking longer than the effective frame rate to process are not taken into account when assigning slices. For instance if the slice-to-frame ratio were 1:3, then application 210 can assign a workload slice to an upcoming frame after three frames have been rendered. Frames that are skipped due to the processing of a workload slice are not considered as a rendered frame when assigning workload slices according to slice-to-frame ratio 240.

In some embodiments, workload scheduler 220 can include safety measures that prevent adjustments to the slice-to-frame ratio 240 that are larger than a predefined threshold. This can prevent spikes in the effective frame rate or effective slice rate from affecting slice-to-frame ratio 240. In one embodiment, workload scheduler 220 can include a rule that prevents adjustments of more than one to the slice-to-frame ratio. For example if slice-to-frame ratio 240 is currently 3 workload slices per upcoming frame and the predefined threshold for adjustment is +−1, then workload scheduler 220 can at most adjust the slice-to-frame ratio to 2 workload slices per upcoming frame or 4 workload slices per upcoming frame.

Application 210 can periodically receive adjustments to slice-to-frame ratio 240 from workload scheduler 220 and in turn adjust the rate in which workload slices are assigned to upcoming frames. In one embodiment, workload scheduler 220 can constantly monitor the performance of application 210 and transmit to application 210 an update to slice-to-frame ratio 240 when one is available.

Figure 3:
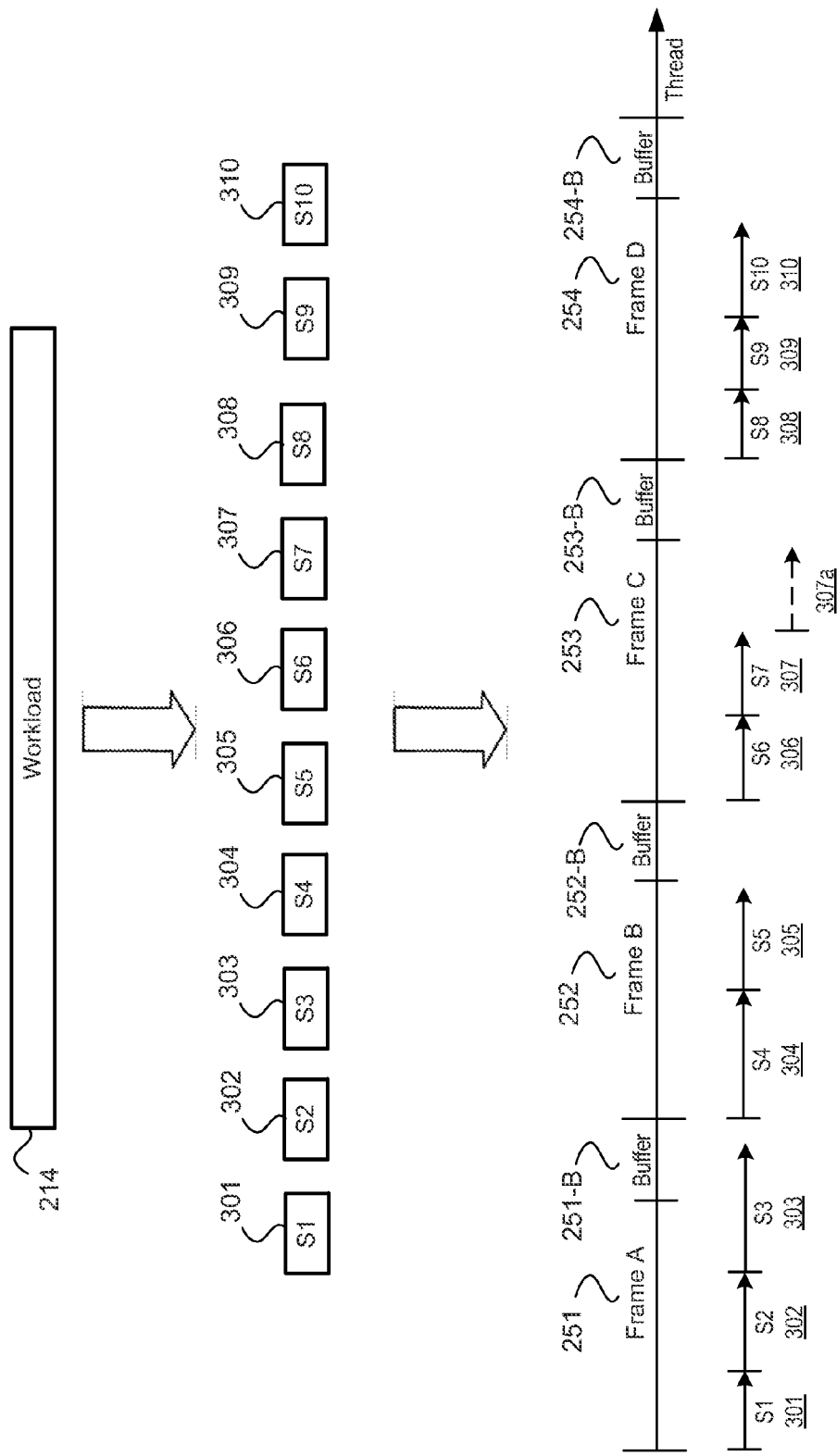
FIG. 3 depicts a workflow for assigning workload slices to upcoming frames according to one embodiment.

FIG. 3 depicts a workflow for assigning workload slices to upcoming frames according to one embodiment. Workflow 300 is an example where multiple workload slices are assigned to an upcoming frame. For simplicity, upcoming frames 251, 252, 253, and 254 are illustrated as having substantially the same effective frame rate. However, it is understood by one of skill in the art that the techniques here are also applicable to a dynamically changing effective frame rate. Workflow 300 can be performed by a combination of application 210 and workload scheduler 220. For example, application 210 can divide up a workload into workload slices and assign the workload slices to upcoming frames while workload scheduler 220 calculates the slice-to-frame ratio based on measurements of the effective slice rate and effective frame rate.

Workflow 300 can begin by dividing workload 214 into multiple workload slices. Each workload slice can be substantially the same size. For example, each workload slice can be an iteration through a function of application 210. Here, workload 214 has been divided into workload slices 301, 302, 303, 304, 305, 306, 307, 308, 309, and 310. Workflow 300 can assign workload slices to upcoming frames to be processed. In some embodiments, each upcoming frame can include a frame buffer. Typically when a frame takes longer than expected to process, a subsequent frame can be skipped so that playback of the video is not delayed. The frame buffer can minimize the occurrence of skipped frames by providing a cushion in the duration of the frame that is unaccounted for when calculating the slice-to-frame ratio. For example if the measured frame rate is 40 ms, calculations of the slice-to-frame ratio may be based on an effective frame rate of 30 ms, thus providing a 10 ms buffer to each frame. The frame buffer can prevent frames from being skipped when the time to perform a workload slice is slightly longer than expected.

Initially, workflow 300 can apply a default slice-to-frame ratio to an upcoming frame. Here, the default slice-to-frame ratio is 3:1 (e.g., three workload slices per one frame). As a result, workload slices 301, 302, and 303 are assigned to upcoming frame 251. When frame 251 is finished being rendered, workflow 300 can obtain measurements that are associated with the rendered frame. In one embodiment, workflow 300 can obtain measurements of the time it took to complete frame 251 and the time it took to complete workload slices 301, 302, and 303. Workflow 300 can use these measurements to calculate the effective frame rate and the effective slice rate. After calculation of the effective frame rate and effective slice rate, workflow 300 can make adjustments to the slice-to-frame ratio according to the effective frame rate and the effective slice rate. In this example, the time it took to execute workload slices is slowly increasing. One reason for this can be more load on the system. As shown, workload slice 303 takes more time than workload slice 302 since the line segment is longer. Similarly workload slice 302 takes more time than workload slice 301. As a result, the workload slices are taking more time that originally estimated, which has led to the execution of workload slice 303 within frame buffer 251-B. Based on the effective frame rate (which remains constant) and the effective slice rate (which has increased), workflow 300 can reduce the slice-to-frame ratio to 2:1 (e.g., two workload slices per one frame). As a result, workflow 300 will assign two workload slices to frame 252 instead of three workload slices. Workload slices 304 and 305 are assigned to frame 252.

When frame 252 is finished being rendered, workflow 300 can again obtain measurements that are associated with the rendered frame. Here, workflow 300 can obtain measurements of the time it took to complete rendering of frame 251 and the time it took to complete processing workload slices 304 and 305. Workflow 300 can calculate the effective frame rate and effective slice rate from the measurements and then in turn calculate the slice-to-frame ratio. Here, the time to process the workload slices is decreasing. Processing workload slice 305 takes less time than processing workload slice 304. As a result, processing of the workload slices has not encroached into frame buffer 252-B as it did in frame buffer 251-B. Based on the calculated slice-to-frame ratio, workflow 300 can determine that no adjustments need to be made to the slice-to-frame ratio. As a result, workflow 300 assigns 2 workload slices to the next upcoming frame, frame 253. Workload slices 306 and 307 are assigned to frame 253.

When frame 253 is finished being rendered, workflow 300 can obtain measurements that are associated with frame 253 and the same process described above can be repeated. Here, the time it took to complete workload slices 306 and 307 is decreasing. Thus, the effective slice rate has been reduced to a value which allows the slice-to-frame ratio has been incremented to three slices per frame. As shown, an extra workload slice 307a could have been executed in frame 253 without encroaching into frame buffer 253-B. Due to the update to the slice-to-frame ration, workflow 300 can assign workload slices 308, 309, and 310 to frame 254.

In another embodiment, workflow 300 can modify the slice-to-frame ratio using a different technique which depends on determining whether processing of a workload slice enters the frame buffer. If the workload slices assigned to the frame are completed at least a predefined length of time before reaching the frame buffer, workflow 300 can increment the slice-to-frame ratio based on the assumption that an extra workload slice could have been performed in the rendered frame. As a result, an upcoming frame would be assigned an additional workload slice over the currently rendered frame. Alternatively if the workload slices assigned to the frame are completed within the predefined length of time before reaching the frame buffer and does not encroach into the frame buffer, workflow 300 can allow the slice-to-frame ratio to remain the same. As a result, an upcoming frame would be assigned the same number of workload slices as the currently rendered frame. Lastly if the workload slices assigned to the frame are completed within the frame buffer, then too many workload slices have been assigned. As a result, workflow 300 can decrement the slice-to-frame ratio based on the assumption that too many workload slices have been performed in the rendered frame.

As shown here, workflow 300 can recalculate the slice-to-frame ratio upon completion of each rendered frame. In other embodiments, workflow 300 can recalculate the slice-to-frame ratio after a predefined number of rendered frames. For example, workflow 500 can wait until five frames are rendered before recalculating the slice-to-frame ratio. Advantages of delaying the recalculation of the slice-to-frame ratio is a reduction in computations performed by workflow 300.

Figure 4:
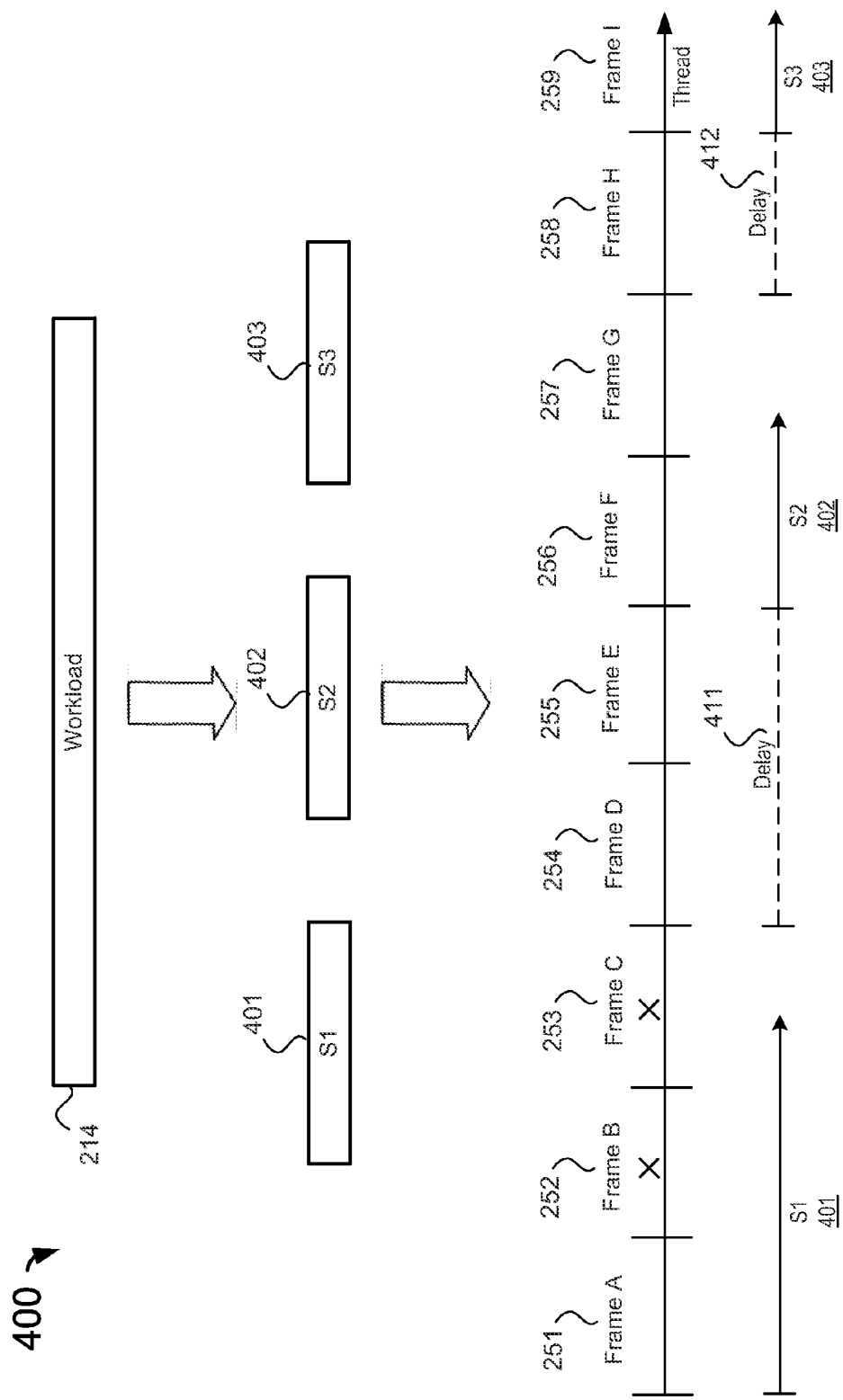
FIG. 4 depicts a workflow for assigning workload slices to upcoming frames according to another embodiment.

FIG. 4 depicts a workflow for assigning workload slices to upcoming frames according to another embodiment. Workflow 400 is an example where a workload slice is assigned across multiple frames. Similar to FIG. 3, upcoming frames 251, 252, 253, 254, 255, 256, 257, 258, and 259 are illustrated as having substantially the same effective frame rate for simplicity. However, it is understood by one of skill in the art that the techniques here are also applicable to a dynamically changing effective frame rate. Workflow 400 can be performed by a combination of application 210 and workload scheduler 220. For example, application 210 can divide up a workload into workload slices and assign the workload slices to upcoming frames while workload scheduler 220 calculates the slice-to-frame ratio based on measurements of the effective slice rate and effective frame rate.

Workflow 400 can begin by dividing workload 214 into workload slices 401, 402, and 403. Workload slices 401, 402, and 403 can be substantially the same size. Once the workload slices are created, workflow 400 can determine whether the estimated processing time of a workload slice is longer than the effective frame rate. If the estimated processing time of a workload slice is longer than the effective frame rate, workflow 400 can space out the workload slices across multiple frames in order to reduce the choppiness or unresponsiveness of the rendered video. In one embodiment, workflow 400 can monitor the actual processing time of the workload slice 401. When workload slice 401 is completed, the processing time of workload slice 401 can be compared against the processing time of rendered frame 251 to adjust the slice-to-frame ratio. For example if the processing time of the workload slice is 110 ms and the effective frame rate is 40 ms, then the slice-to-frame ratio would be 1 workload slice for each 2.75 frames. In one embodiment, workload 400 can round the slice-to-frame ratio to the next integer, which would mean the slice-to-frame ratio is 1:3 (e.g., one workload slice for every three frames). Since workload slice 401 was assigned to frame 251 and frames 252 and 253 were skipped, the next two frames (frame 254 and frame 255) are rendered without a workload slice. As such, workflow 400 introduces delay 411. Thus, workflow 400 delays the assignment of workload slice 402 until upcoming frame 256. In other embodiments, workflow 400 can round the slice-to-frame ratio to the nearest integer.

In a similar fashion, workflow 400 monitors the completion of workload slice 402. Upon completion of workload slice 402, workflow 400 can recalculate the effective slice rate. In one embodiment, recalculation of the effective slice rate can be based on the processing time of workload slice 402. In another embodiment, recalculation of the effective slice rate can be based on the processing time of workload slice 401 and workload slice 402. Once the effective slice rate is calculated, workflow 400 can adjust the slice-to-frame ratio based on the effective slice rate and the effective frame rate. In one embodiment, the effective slice rate can be divided by the effective frame rate to generate the slice-to-frame ratio. Here, the slice-to-frame ratio has dropped to one workload slice every two frames. Since workload slice 402 was assigned to frame 256, the next frame (frame 257) is rendered without an assigned workload slice due to delay 412. Thus, workflow 400 delays the assignment of workload slice 403 until frame 259.

In another embodiment, workflow 400 can modify the slice-to-frame ratio by using a different technique that measures the number of skipped frames. Workflow 400 can monitor the completion of a workload slice. Upon detecting completion of a workload slice, workflow 400 can determine the number of frames that were skipped due to the processing time of the workload slice. Workflow 400 can then delay the assignment of the next workload slice by the number of skipped frames. For example if two frames (frames 252 and 253) were skipped due to the processing time of workload slice 401, then workflow 400 would delay the assignment of the next workload slice by two frames. This would reduce choppiness and unresponsiveness of the rendered video by providing a buffer for the system to catch up on processing before the next workload slice is assigned to a frame.

Figure 5:
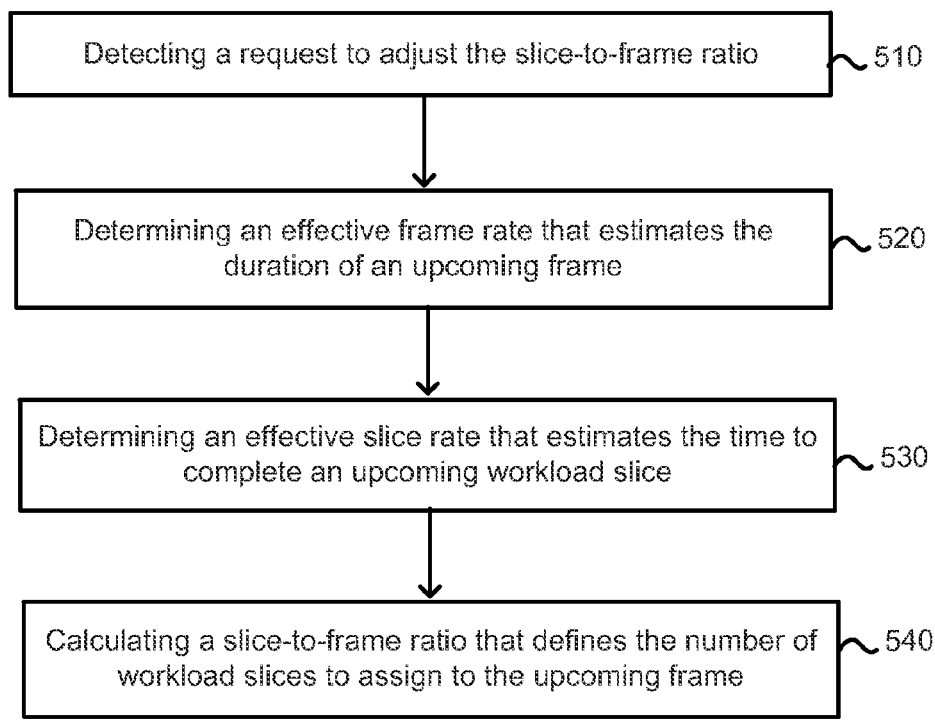
FIG. 5 depicts a simplified flowchart 500 for workload scheduler 220 according to one embodiment.

FIG. 5 depicts a simplified flowchart 500 for workload scheduler 220 according to one embodiment. Simplified flowchart 500 is an example where workload scheduler 220 calculates the slice-to-frame ratio that is to be used by application 210 to assign workload slices to upcoming frames. At 510, workload scheduler 220 detects a request to adjust the slice-to-frame ratio. In one embodiment, the request can be detecting the completion of a rendered frame. After detecting the request, workload scheduler 220 can determine the effective frame rate at 520. As described above, the effective frame rate estimates the duration of an upcoming frame. In one example, the duration of the upcoming frame can be measured without considering the buffer in the upcoming frame. Thus, if the upcoming frame include a frame buffer, the effective frame rate would be based on the duration of the upcoming frame minus the frame buffer. In one embodiment, workload scheduler 220 can determine the effective frame rate by measuring the duration of a rendered frame. For example, the duration of the most recently rendered frame can be set as the effective frame rate. In another embodiment, workload scheduler 220 can determine the effective frame rate by analyzing the duration of multiple rendered frames. For example, the average duration for a predefined number of recently rendered frames can be set as the effective frame rate. In yet other embodiments, the effective frame rate can be calculated from a sum of multiple rendered frames which have been weighted according to their relevance to the upcoming frame.

After determining the effective frame rate, workload scheduler 220 can determine the effective slice rate at 530. As discussed above, the effective slice rate is an estimate on the time it will take to complete an upcoming workload slice. In one embodiment, workload scheduler 220 can determine the effective slice rate by measuring the processing time of a recently completed workload slice. In other embodiments, workload scheduler 220 can determine the effective slice rate by analyzing the processing time of multiple workload slices that were recently completed. In one example, the processing time of the recently completed workload slices can be weighted according to their relevance to the upcoming workload slice.

Once the effective frame rate and the effective slice rate have been determined, workload scheduler 220 can calculate a slice-to-frame ratio at 540. The slice-to-frame ratio defines the rate in which workload slices are assigned to upcoming frames. In one embodiment, workload scheduler 220 can calculate the slice-to-frame ratio by comparing the effective slice rate by the effective frame rate. For example if the effective frame rate is 40 ms and the effective slice rate is 10 ms, workload scheduler 220 can calculate the slice-to-frame ratio as 4:1 since the time it takes to complete four workload slices at 10 ms each is equal to the duration of a single frame, which is 40 ms. In some embodiments, workload scheduler 220 can include one or more rules that constrain the calculated slice-to-frame ratio. In one embodiment, a rule can require that the calculated slice-to-frame ratio can deviate from a previously calculated slice-to-frame ratio by a predetermined amount. For example, the rule can specify that the new slice-to-frame ratio can only deviate from the previous slice-to-frame ratio by a value of 2. Therefore if the previously slice-to-frame ratio was 4:1, then the new slice-to-frame ratio can be within the range of 2:1 and 6:1. When the newly calculated slice-to-frame ratio is outside the range, the previous slice-to-frame ratio can be applied instead. Alternatively, the boundary of the range can be used. For instance if the calculated slice-to-frame ratio is 8:1 and the upper limit is 6:1, workload scheduler 220 can set the new slice-to-frame ratio as 6:1.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A computer-implemented method for processing a workload in a single-threaded environment, comprising:
    detecting an input that initiates the workload to be processed in the single-threaded environment;
    determining, by a computing device, an effective frame rate based on at least one rendered frame in the single-threaded environment, the effective frame rate being used to estimate a duration of an upcoming frame;
    determining, by the computing device, an effective slice rate based on at least one completed workload slice, wherein each workload slice represents a portion of the workload to be processed in the single-threaded environment, the effective slice rate being used to estimate a time to complete an upcoming workload slice of the workload;
    calculating, by the computing device, a slice-to-frame ratio according to the effective frame rate and the effective slice rate during runtime of the single-threaded environment, wherein the slice-to-frame ratio defines a rate at which workload slices are assigned to one or more upcoming frames;
    dynamically assigning, by the computing device, one or more upcoming workload slices to be processed during the rendering of the one or more upcoming frames according to the calculated slice-to-frame ratio; and
    rendering, by the computing device, the one or more upcoming frames while processing the one or more upcoming workload slices at the rate defined by the calculated slice-to-frame ratio concurrently with the rendering of the one or more upcoming frames.

2. The computer-implemented method of claim 1, further comprising:
    determining, by the computing device, an updated effective frame rate based on the one or more upcoming frames that were rendered;
    determining, by the computing device, an updated effective slice rate based on the one or more upcoming frames that were rendered; and
    dynamically adjusting, by the computing device, the slice-to-frame ratio according to the updated effective frame rate and the updated effective slice rate.

3. The computer-implemented method of claim 1, wherein the workload is triggered from an event detected during presentation of the at least one rendered frame in the single-threaded environment.

4. The computer-implemented method of claim 1, further comprising splitting, by the computing device, the workload into a plurality of substantially equal workload slices.

5. The computer-implemented method of claim 1, wherein determining the effective frame rate comprises measuring, by the computing device, a duration of the at least one rendered frame.

6. The computer-implemented method of claim 1, wherein determining the effective slice rate comprises measuring, by the computing device, a processing time of the at least one completed workload slice.

7. The computer-implemented method of claim 1, wherein a workload slice from the at least one completed workload slice was processed along with a frame from the at least one rendered frame.

8. A non-transitory computer readable storage medium containing instructions for processing a workload in a single-threaded environment, that when executed, control a computer system to be configured for:
   detecting an input that initiates the workload to be processed in the single-threaded environment:
   determining an effective frame rate based on at least one rendered frame in a single-threaded environment, the effective frame rate being used to estimate a duration of an upcoming frame;
   determining an effective slice rate based on at least one completed workload slice, wherein each workload slice represents a portion of a workload to be processed in the single-threaded environment, the effective slice rate being used to estimate a time to complete an upcoming workload slice of the workload;
   calculating a slice-to-frame ratio according to the effective frame rate and the effective slice rate during runtime of the single-threaded environment, wherein the slice-to-frame ratio defines a rate at which workload slices are assigned to one or more upcoming frames;
   dynamically assigning one or more upcoming workload slices to be processed during the rendering of the one or more upcoming frames according to the calculated slice-to-frame ratio; and
   rendering the one or more upcoming frames while processing the one or more upcoming workload slices at the rate defined by the calculated slice-to-frame ratio concurrently with the rendering of the one or more upcoming frames.

9. The non-transitory computer readable storage medium of claim 8, further comprising:
   determining an updated effective frame rate based on the one or more upcoming frames that were rendered;
   determining an updated effective slice rate based on the one or more upcoming frames that were rendered; and
   dynamically adjusting the slice-to-frame ratio according to the updated effective frame rate and the updated effective slice rate.

10. The non-transitory computer readable storage medium of claim 8, wherein the workload is triggered from an event detected during presentation of the at least one rendered frame in the single-threaded environment.

11. The non-transitory computer readable storage medium of claim 8, further comprising splitting the workload into a plurality of substantially equal workload slices.

12. The non-transitory computer readable storage medium of claim 8, wherein determining the effective frame rate comprises measuring a duration of the at least one rendered frame.

13. The non-transitory computer readable storage medium of claim 8, wherein determining the effective slice rate comprises measuring a processing time of the at least one completed workload slice.

14. The non-transitory computer readable storage medium of claim 8, wherein a workload slice from the at least one completed workload slice was processed along with a frame from the at least one rendered frame.

15. An apparatus, comprising:
   one or more computer processors; and
   a non-transitory computer-readable storage medium comprising instructions for processing a workload in a single-threaded environment, that when executed, control the one or more computer processors to be configured for:
   detecting an input that initiates the workload to be processed in the single-threaded environment;
   determining an effective frame rate based on at least one rendered frame in a single-threaded environment, the effective frame rate being used to estimate a duration of an upcoming frame;
   determining an effective slice rate based on at least one completed workload slice, wherein each workload slice represents a portion of a workload to be processed in the single-threaded environment, the effective slice rate being used to estimate a time to complete an upcoming workload slice of the workload;
   calculating a slice-to-frame ratio according to the effective frame rate and the effective slice rate during runtime of the single-threaded environment, wherein the slice-to-frame ratio defines a rate at which workload slices are assigned to one or more upcoming frames;
   dynamically assigning one or more upcoming workload slices to be processed during the rendering of the one or more upcoming frames according to the calculated slice-to-frame ratio; and
   rendering the one or more upcoming frames while processing the one or more upcoming workload slices at the rate defined by the calculated slice-to-frame ratio concurrently with the rendering of the one or more upcoming frames.

16. The apparatus of claim 15, further comprising:
   determining an updated effective frame rate based on the one or more upcoming frames that were rendered;
   determining an updated effective slice rate based on the one or more upcoming frames that were rendered; and
   dynamically adjusting the slice-to-frame ratio according to the updated effective frame rate and the updated effective slice rate.

17. The apparatus of claim 15, wherein the workload is triggered from an event detected during presentation of the at least one rendered frame in the single-threaded environment.

18. The apparatus of claim 15, wherein determining the effective frame rate comprises measuring a duration of the at least one rendered frame.

19. The apparatus of claim 15, wherein determining the effective slice rate comprises measuring a processing time of the at least one completed workload slice.

20. The apparatus of claim 15, wherein a workload slice from the at least one completed workload slice was processed along with a frame from the at least one rendered frame.

* * * * *